United States Patent [19]
Peterson et al.

[11] 3,905,265
[45] Sept. 16, 1975

[54] DIE CUTTING MACHINE

[75] Inventors: Raymond L. Peterson, Beverly Farms; Robert H. Garritt, Jr., Dover, both of Mass.

[73] Assignee: American Shoe Machinery Corporation, Woburn, Mass.

[22] Filed: Dec. 3, 1973

[21] Appl. No.: 421,274

[52] U.S. Cl. .................. 83/537; 83/541; 83/DIG. 1
[51] Int. Cl.² .......................................... B26F 1/40
[58] Field of Search ............................ 83/534–538, 83/541, DIG. 1

[56] References Cited
UNITED STATES PATENTS

| | | | |
|---|---|---|---|
| 1,010,476 | 12/1911 | Buckminster | 83/537 |
| 3,212,382 | 10/1965 | Haas | 83/537 |
| 3,690,206 | 9/1972 | Pickles | 83/537 |

*Primary Examiner*—J. M. Meister
*Attorney, Agent, or Firm*—Arthur Z. Bookstein

[57] ABSTRACT

A die cutting machine includes a cutting table on which sheet material to be cut is placed with a cutting die resting on the sheet material. The machine includes a beam which is mounted for movement to a desired selected location over the table and then is urged downwardly toward the table in a cutting stroke to drive the die through the sheet. Powered means are provided for swinging the beam to its desired position over the table and for effecting the cutting stroke. Control means are provided which enable the beam to be easily positioned and to effect the cutting action. The control means includes a number of features which enhance operator safety and minimize operator fatigue.

14 Claims, 10 Drawing Figures

DIE CUTTING MACHINE

BACKGROUND OF THE INVENTION

This invention relates to die cutting machines of the type in which, with a sheet to be cut placed on a cutting table of the machine, a cutting die is placed on the sheet and a heavy impact member, such as a beam, is swung into position over the die and is then driven downwardly to cut a portion of the sheet to the shape of the die. Machines of this type are employed to cut sheet materials such as leather for shoe making or other purposes, plastics, fabrics, fibrous sheets and the like. Typical of the operation of such machines is the initial placement of the sheet material on the cutting table while the beam is in an out-of-the-way position and subsequent placement of a cutting die of selected shape at a selected location on the sheet to be cut. The operator then causes the beam to move to a position over the die and then actuates a powered mechanism which drives the beam down to cause the die to cut the sheet material. The beam then rises to its upward position.

Among the difficulties which have been presented with such machines has been that, because of the massive weight of the beam, increased operator fatigue sometimes results which, in turn, increases the possibility of industrial accidents. In order to reduce the manual effort required of the operator to cause the beam to swing between remote and operative positions, powered mechanisms have been employed in such machines to swing the beam by means of remotely located controls manipulated by the operator. One such control arrangement includes a "joy stick" which is supported at the front of the machine on the frame and which is connected through the control circuitry to cause the beam to swing to the left or to the right. The "joy stick" can be operated by one hand leaving the operator's other hand free. A measure of safety is provided in that after the beam has been swung to the desired cutting position the operator must actuate a second switch with his other free hand to effect the cutting stroke. With this arrangement one of the operator's hands is free to be placed on or about the cutting table during swinging of the beam into cutting position. Inasmuch as the operators usually try to maximize their rate of production it is not uncommon to see an operator place his hand on the table in readiness to reposition the cutting die while swinging the beam away and then immediately swinging the beam back over the die for the next cutting stroke. The ability of the machine to be operated in this manner presents some opportunity for the operator to injure himself by the return swing of the massive beam should it strike his free hand or wedge his hand between the beam, the die and/or the table should he fail to remove it in time.

The danger described above has not gone unrecognized and some proposals have been made to provide further operator safety. In general, the proposals have related to the inclusion of proximity sensing devices mounted to the sides of the beam which sense engagement of the swinging beam with an obstruction, such as the operator's hand or arm, and which then stops the movement of the beam. These devices fall short of providing the safety toward which they are directed because the momentum of the heavy and massive beam does not lend itself to immediate termination of the beam motion.

It is among the primary objects of the invention to provide an improved control mechanism for a powered beam die cutting machine.

SUMMARY OF THE INVENTION

The beam of the machine is mounted at the top of a vertically disposed spindle which, in turn, is supported in the machine frame for vertical and rotary motion. Hydraulic means are provided for raising and lowering the spindle and for rotating the spindle about its vertical axis. A control arm is pivoted over the table to any desired lateral position. The end of the control arm includes a pair of manually operable switches which are positioned sufficiently far apart to require that both of the operator's hands be employed to actuate both switches. The switches are incorporated into the control circuitry of the machine to require that they must be actuated concurrently in order for the beam to swing to a cutting position and/or to effect the cutting stroke. This insures that the operator's hands will be out of the way at all critical times and not just during the cutting stroke.

Actuation of one of the switches on the control arm automatically swings the beam away from the operator to a remote position and means are provided in the control circuitry to preselect whether the remote position of the beam is to the right or to the left of the spindle, to suit right or left handed operators. The beam is swung to a cutting position by positioning the control arm at the desired location over the cutting table. Means are provided to sense the relative position of the control arm and beam. Actuation of both switches on the control arm then causes the beam to swing toward and into alignment with the control arm as long as the operator maintains both switches actuated. Once the beam and control arm are aligned, continued manual actuation of the switches causes the beam to move downwardly in a cutting stroke and then to be raised to its upper position. The control circuitry enables the operator to swing the control arm to the next intended cutting location before the previous cutting stroke has been completed as long as the two switches on the end of the control arm remain actuated.

In its broad sense, the invention employs a technique in which the control member may be moved to any position within a range of positions which are analogous to the various relative working positions of the impact member with respect to the cutting table. Thus, while the illustrative embodiment of the invention relates to an impact member in the form of a swingable beam with the control arm located above the beam, die cutting machines of other configurations employing an impact member movable along other paths with respect to the cutting table, may have equivalent control members mounted elsewhere in the machine which incorporate the analog technique of the invention.

It is among the objects of the invention to provide a die cutting machine having a powered beam swing with improved control devices.

Another object of the invention is to provide a die cutting machine having a cutting table and an impact member movable to substantially any working position over the cutting table in which the working position of the impact member is determined by a control member movable within a range of positions which are analogous to the various positions of the impact member with respect to the cutting table.

Another object of the invention is to provide a die cutting machine having an improved degree of operator safety.

A further object of the invention is to provide a die cutting machine which avoids the use of proximity sensing devices.

A further object of the invention is to provide a die cutting machine which insures that the operator's hands and arms are out of the way during critical periods of operation of the machine.

Still another object of the invention is to provide a die cutting machine in which the operational controls are more comfortably operated and which results in less operator fatigue.

DESCRIPTION OF THE DRAWINGS

The foregoing and other objects and advantages of the invention will be understood more fully from the following further description thereof, with reference to the accompanying drawings wherein.

DESCRIPTION OF THE PREFERRED EMBODIMENT

Figure 1:
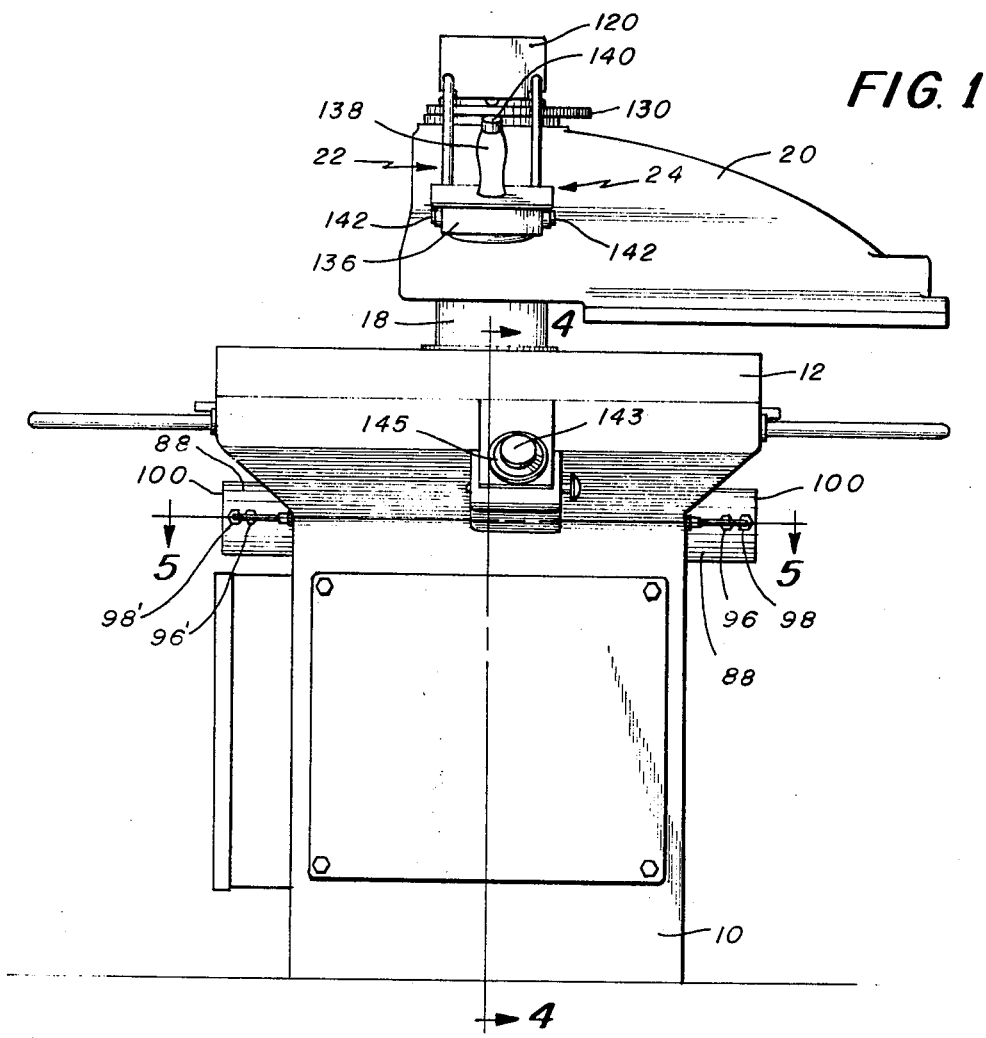
FIG. 1 is a front elevation of the machine.
Figure 2:
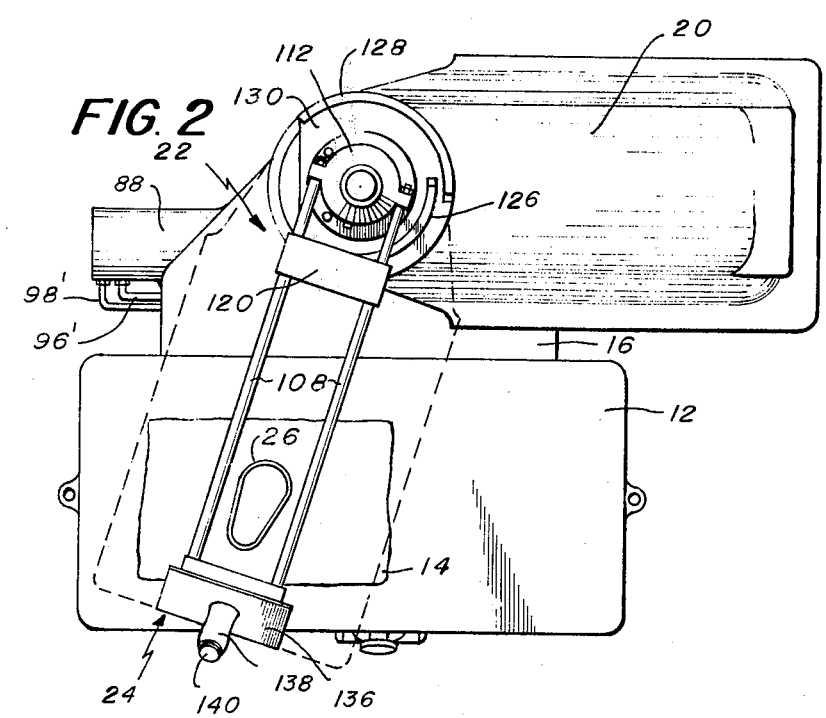
FIG. 2 is a plan view of the machine.
Figure 3:
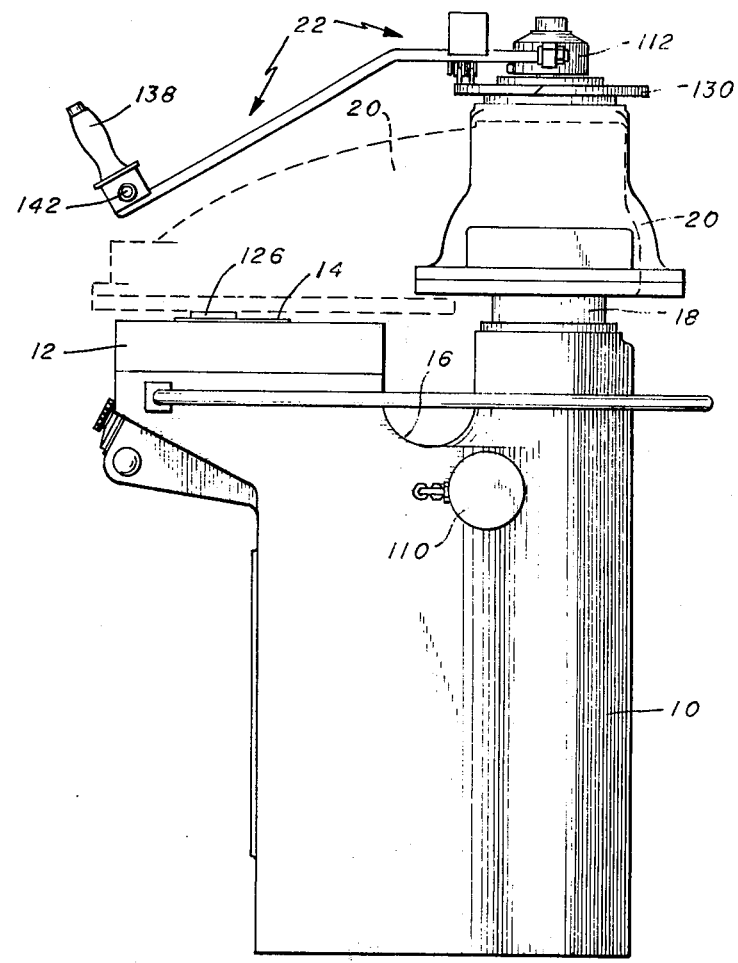
FIG. 3 is a side elevation of the machine.

The machine includes a frame 10 which supports a flat cutting table 12 on which sheet material 14 to be cut may be placed. The frame may be formed to define a transversely extending channel 16 rearwardly of the table 12 to hold and receive rolls of sheet material 14 which can be fed over the table 12 as needed. Mounted centrally in the machine and rearwardly of the table 12 is a spindle 18 which is journaled for rotation about and vertical movement along its vertical central axis. The beam 20, which is of the massive construction described above, is secured to the upper end of the spindle 18 in a manner described below, and can be swung, by rotation of the spindle 18 from a remote position shown in solid in FIGS. 1, 2 and 3 to any location over the table 12 as suggested in phantom in FIG. 2. A control arm mechanism, indicated generally by the reference character 22 is mounted on top of the spindle 18 and extends radially outwardly therefrom and terminates in a control section 24. The control arm mechanism 22 may be swung to any position to enable the operator to selectively place a cutting die 26 (FIG. 2) on the sheet material 14 to be cut. The control arm mechanism 22 may be swung to the location where it is desired to position the beam 20 (over the placed cutting die 26) by controls located at the control section 24. The control mechanism, described fully below, causes the beam first to swing into alignment with the control arm mechanism 22 then to drive the spindle 18 and beam 20 downwardly in a cutting stroke and then return to its up position.

Figure 4:
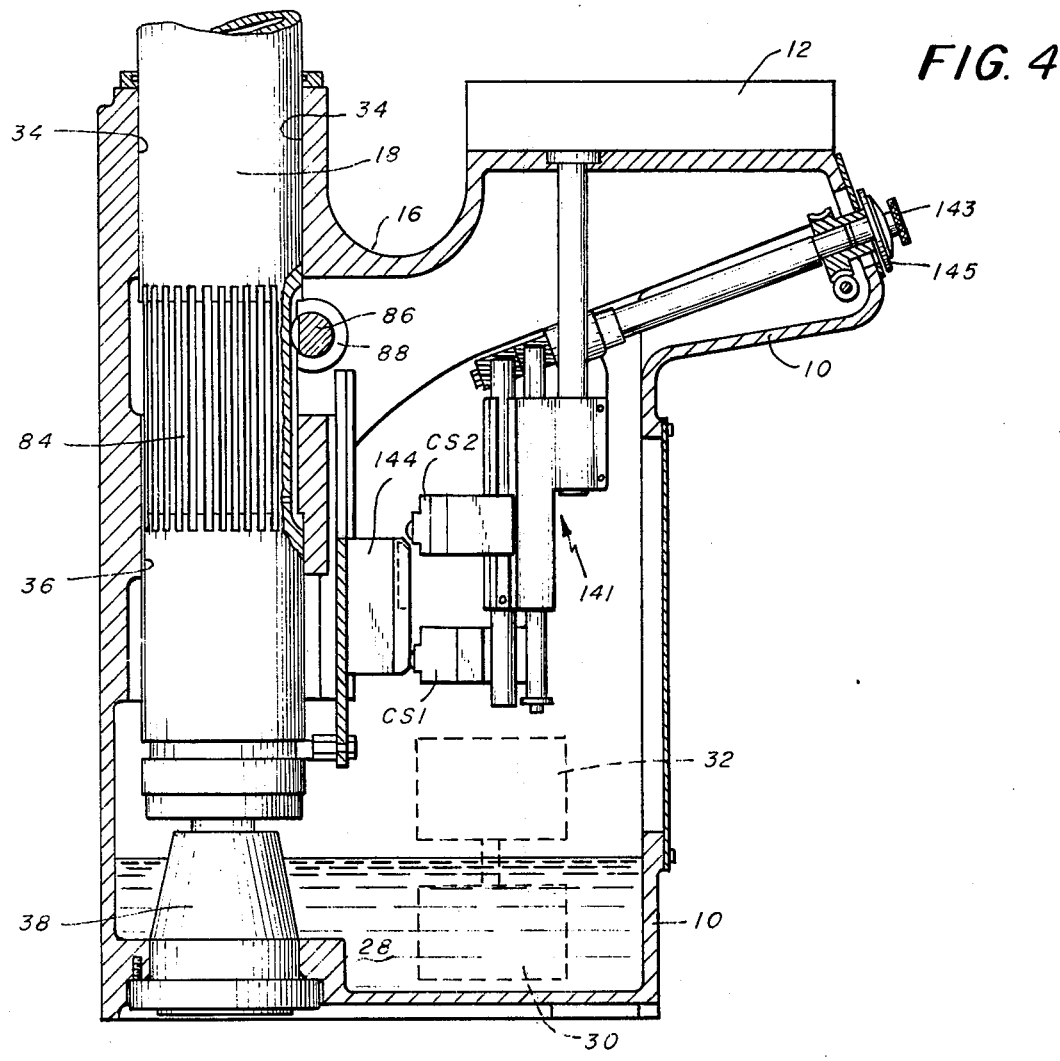
FIG. 4 is a partial sectional elevation of the machine as seen along the line 4—4 of FIG. 1.
Figure 9:
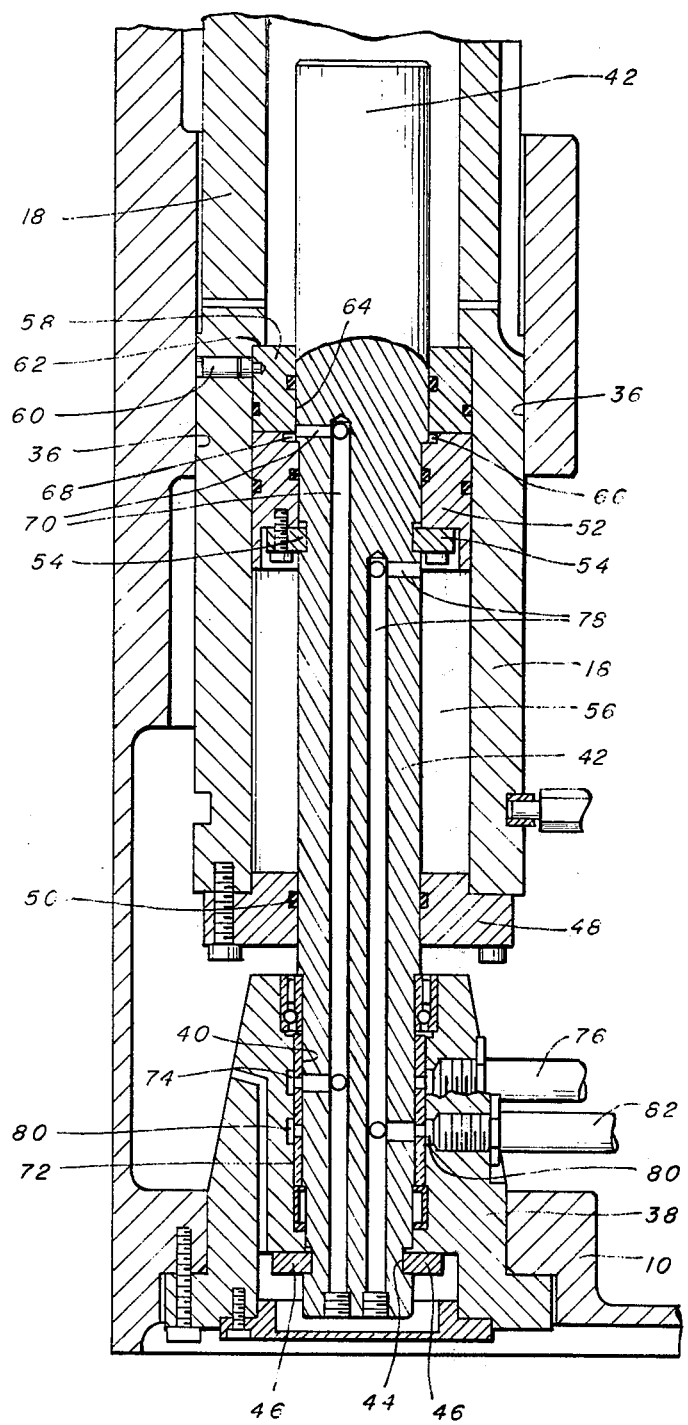
FIG. 9 is an enlarged sectional elevation of the mechanism for raising and lowering the spindle.

As shown in FIGS. 4 and 9, the bottom of the frame is formed to define a reservoir 28 for hydraulic fluid, such as oil. A pump 30 is disposed within the reservoir 28 and is driven by a motor, shown in outline at 32. FIGS. 4 and 9 show the mechanism by which the spindle is driven vertically to raise and lower the beam 20 in its cutting stroke. The spindle 18 is journaled within upper and lower bearing surfaces 34, 36 formed in the frame. Also secured to the frame, below the spindle 18 is a casting 38 having a central bore 40 formed therethrough. A post 42 extends upwardly from the casting 38, through the central bore 40 and is secured by means of a circular groove 44 at the bottom of the post 42 and a split ring 46 which is retained within the circular groove 44 and which is secured to the underside of the casting 38. The post 42 extends upwardly into the hollow spindle 18 through a spindle bottom cap 48 which closes off and seals the lower end of the hollow spindle. A suitable gasket 50 may be provided in the bottom cap 48 to seal the sliding fit between the post 42 and bottom cap 48. A fixed piston 52 is secured to the post 52 between its ends, for example, by a split ring 54 and defines a lower chamber 56 in cooperation with the hollow interior of the spindle and the bottom cap 48. The inner surface of the spindle 18 is slidable about, and sealed with respect to, the outer surface of the fixed piston 42. A movable piston 58 is secured to the inner surface of the spindle 18, as by a number of pins 60 which extend through the spindle and into the piston 58. Movable piston 58 fits within an undercut shoulder 62 of the spindle 18. The movable piston 58 has a central bore 64 which is slidable along the upper end of the post 42. When the spindle is in its fully down position shown in FIG. 9, the movable piston 58 rests on the fixed piston 52. The fixed piston 52 has a cut away portion 66 which defines, in cooperation with the movable piston 58 and the post 42, an expandable upper chamber 68. The post 42 is raised from its lowermost position shown by pumping hydraulic fluid into the expandable upper chamber 68 and is lowered by fluid pumped into the lower chamber 56.

Figure 10:
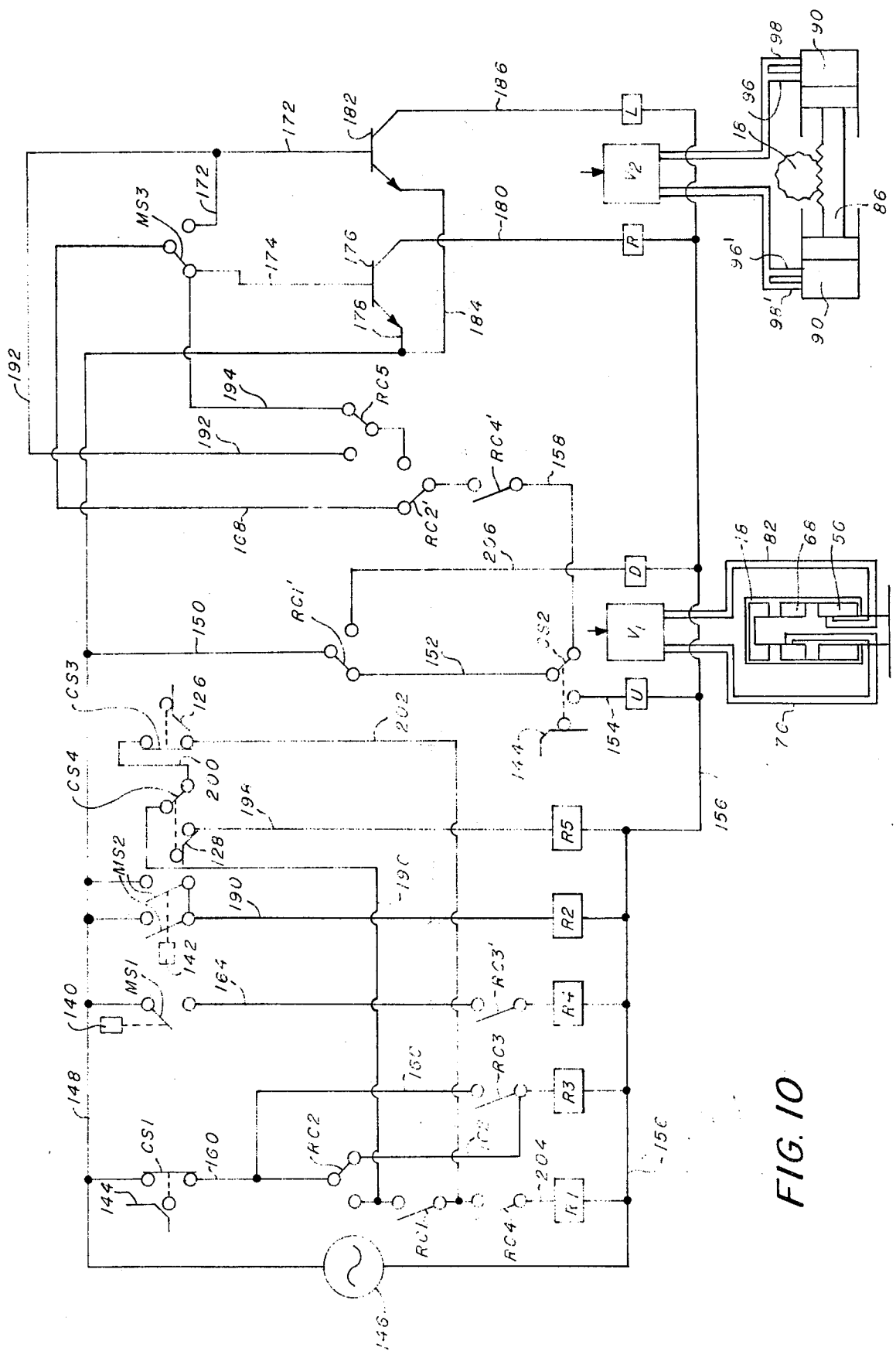
FIG. 10 is a schematic illustration of the control mechanism embodied in the machine.

The fluid for raising the spindle 18 is directed to the upper chamber 68 through passageways 70 formed through the post 42. Fluid is directed into and out of the passageways 70 through a cylindrical seal 72 which has holes formed therein which permit the oil to flow into an annular groove 74 formed in the bore 40 of the casting 38. The annular groove 74 is in communication with hydraulic line 76 fitted to the casting 38 which, in turn, is connected to a three-position valve $V_1$ (FIG. 10). Similarly, fluid is directed to and from the lower chamber 56 through passageways 78, through the holes in the cylindrical seals 72, into an annular groove 80 and to the hydraulic line 82 which is also connected to the valve $V_1$.

Figure 5:
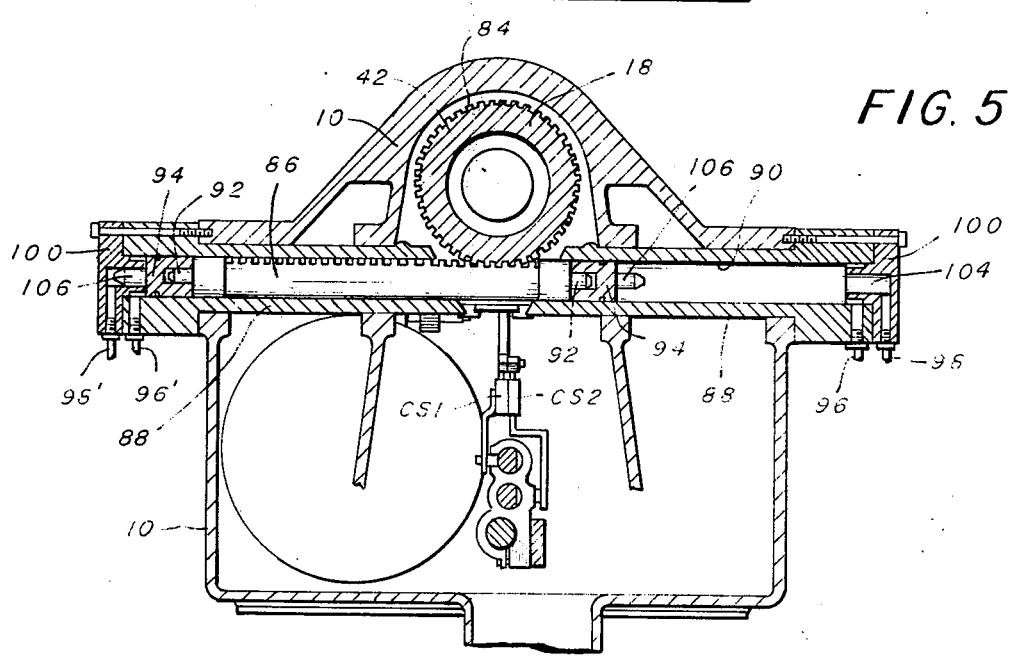
FIG. 5 is a sectional plan view of the machine as seen along the line 5—5 of FIG. 1 showing the mechanism for swinging the beam.

Rotation of the spindle 18 is effected by a rack and pinion arrangement shown in FIGS. 4 and 5. This arrangement includes the formation of a circular rack, in the form of splines 84 formed about the exterior of the spindle 18 intermediate its ends. The splines 84 are in mesh with a transversely extending rack 86 which may be driven to either side thus effecting rotation of the beam 18 in either direction which enables the beam to be raised or lowered in any transverse position of the rack. The rack 86 slides through a pair of oppositely disposed, transversely extending cylinders 88 which have receptive bores 90. The opposite ends of the rack 86 are fitted with projections 92 which, in turn, are received in sockets formed in pistons 94. The pistons are appropriately sealed with respect to the cylindrical surfaces 90 to avoid requiring precision machining of a sealing fit between the entire rack and the cylindrical surfaces 90. The rack is driven transversely by directing hydraulic fluid under pressure into either the cylinders 88 while exhausting the other of the cylinders 88. Fluid is directed into and out of the cylinders 88 through lines 96, 98 or 96', 98'. Each of the lines 98, 98' is connected to an end cap 100 which has a fluid passageway 102 formed therethrough, the fluid passageway terminating in an enlarged port 104. The lines 96, 96' may be connected directly to their cylinders 88 in proximity to the port 104 as shown. When driving the rack 86 toward one side of the machine, fluid is admitted into both of the lines 96, 98 or 96', 98'. The control mechanism, described below, determines when the valve $V_2$ which is associated with the lines 96, 98 and 96', 98' shifts to control the position of the rack 86 and, therefore, the position of the beam 20. When the beam is urged to a full out-of-the-way position, the rack is driven fully to one of the ends of the cylinders 88. In order to avoid shock which might result from the abrupt termination of the swing of the massive beam 20, the pistons 94 include valving projections 106 which, when a piston 94 approaches the end of its mechanical limit of travel, enters the port 104 to preclude further flow of exhausting fluid through that port and the line 98 or 98'. While some fluid can still flow through the relatively small outlet leading to line 96 or 96', the reduced flow area helps to decelerate the rack movement and beam swing without risking damage to the machine.

Figure 6:
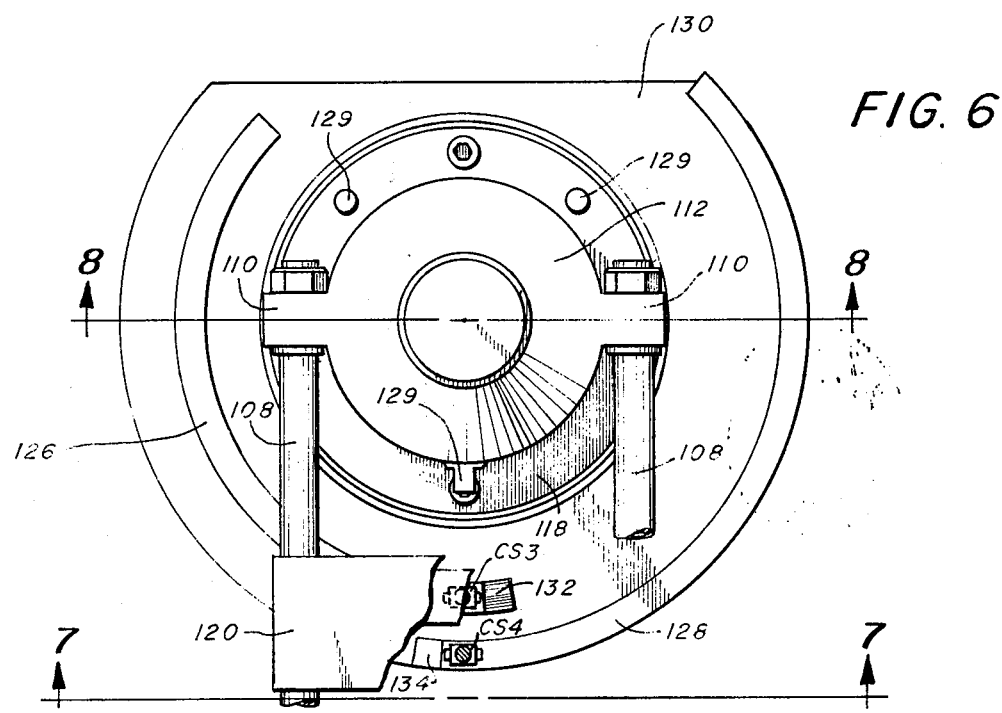
FIG. 6 is an enlarged illustration of the top of the spindle.
Figure 7:
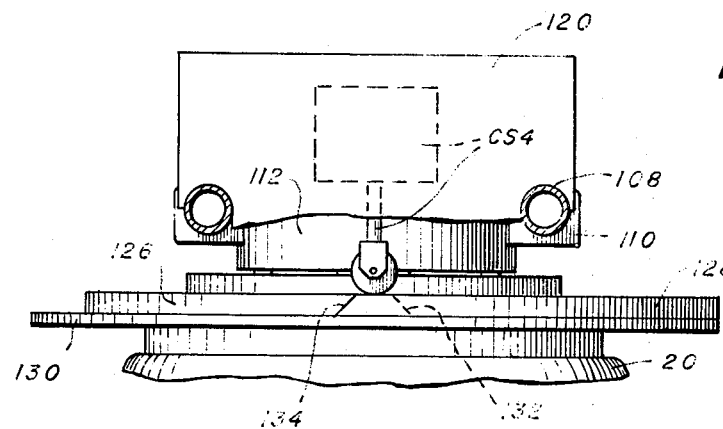
FIG. 7 is an illustration of the top of the spindle as seen along the line 7—7 of FIG. 6.
Figure 8:
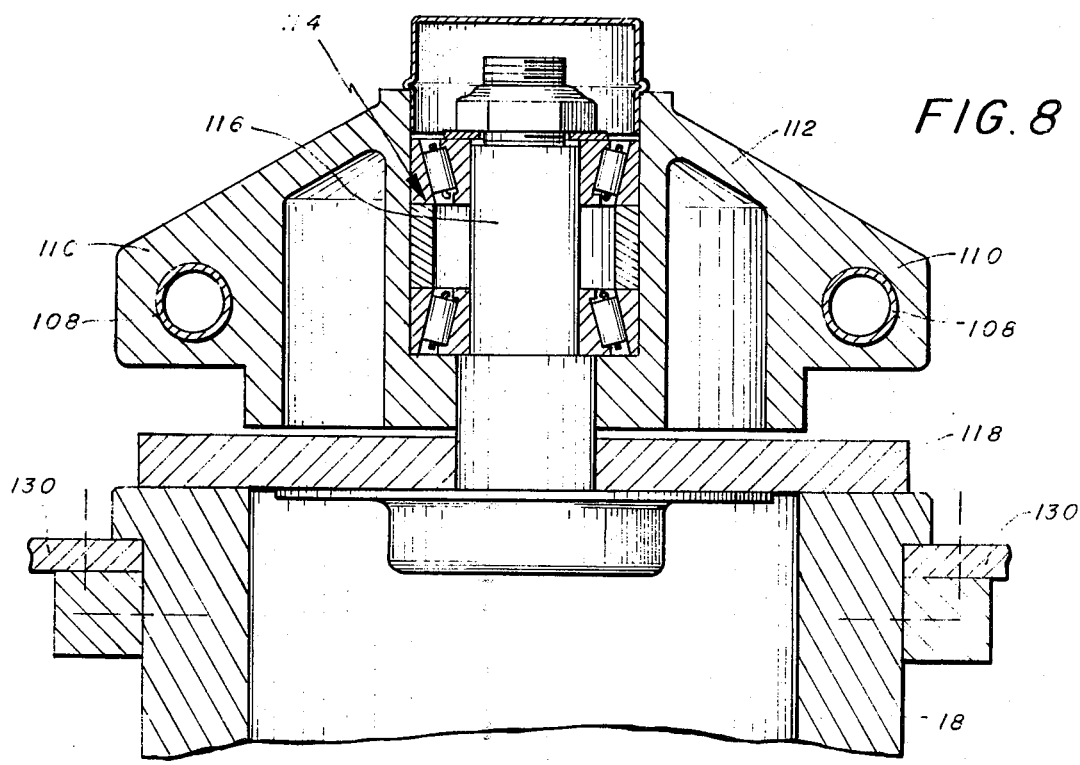
FIG. 8 is a sectional elevation through the top of the spindle as seen along the line 8—8 of FIG. 6.

The control arm mechanism 22 is mounted to the top of the spindle 18 for swinging movement about the axis of the spindle and above the beam 20. The illustrated mechanism 22 includes a pair of arms 108 which are secured at one end to ears 110 which project outwardly from a hub 112. The hub 112 is pivotally mounted to the top of the spindle 18 by means of a bearing assembly 114 by which the hub 112 is rotatably mounted about a vertical rod 116. The lower end of the rod 116 is secured to a spindle top cap 118 which, in turn, is secured to the top of the spindle 18. The arms 108 support a housing 120 which, in turn, supports a pair of cam operable switches CS3 and CS4 which are responsive to the relative angular position of the control arm mechanism 22 and the beam 20 and are incorporated into the control circuitry in a manner described below. The switches CS3, CS4 are operated by a pair of arcuate cams 126, 128 respectively. The cams 126, 128 are secured to a cam plate 130 which, in turn, is secured to the spindle 18 for movement in unison with the spindle. The cams 126, 128 each extend above the upper surface of the cam plate 130 and have inclined camming surfaces 132, 134 to engage the following rollers of the switches CS3, CS4. The leading ends of the cams 126, 128 overlap slightly so that, as shown in FIG. 6, when the control arms 108 are in alignment with the beam 20 both switches CS3, CS4 will be cammed to their upward, actuated position. Any other relative position between the control arms 108 and the beam 20 will cause actuation of only one of these switches, depending on whether the beam 20 is to the right or the left of the control arm mechanism 22.

Means may be provided for limiting the arc of movement of the control arm mechanism such as the mounting of abutting pins 129 to the hub 112 and the cap 118. The arc of movement of the control arm mechanism 22 should be at least sufficiently wide to enable the control arm to be disposed over any position over the cutting table.

The operation and control of the machine may be understood with reference to FIG. 10 which shows a simplified diagram of the control circuitry. In the following description of the control circuitry, relays will be given the general designation R and the contacts which they operate will be designated RC. Manually operable switches will be designated generally MS and cam operated switches will be designated generally as CS.

The machine is controlled primarily through the operator's positioning of the control arm mechanism 22 and actuation of manually operated control switches supported at the free end of the control arm mechanism 22. The free end of the arms 108 support a switch housing 136 which has an upwardly extending handle 138 secured thereto and inclined slightly toward the operator to provide a comfortable grip. The end of the handle 138 includes a thumb button 140 which operates one of the control switches as described below. A pair of side buttons 142 are exposed at opposite sides of the housing 136 and are connected in parallel, as described below, to actuate a second control switch. Location of the pair of actuating buttons 142 on opposite sides of the housing 136 enables the machine to be operated with equal facility by right and left handed operators. The configuration and dimensions of the housing 136, handle 138 and buttons 140, 142 is such that in order to actuate both buttons 140 and 142 the operator must use both hands, one for each button.

As shown in FIG. 4 the heightwise position of spindle 18 is sensed by a pair of cam operated switches CS1, CS2 which are supported in the machine and which are operated by a cam 144 mounted to the spindle for heightwise movement in unison therewith. With the machine in an idle configuration the spindle 18 may be, for example, in its fully lowered position shown in FIGS. 4 and 9 in which cam 144 actuates switch CS1 to open that switch. When the spindle 18 is in its lowered position the cam 144 deactuates switch CS2 to connect solenoid U across the power supply 146 through lines 148, 150, relay contact RC1', lines 152, 154 and 156. Solenoid U is operatively connected to a three position valve $V_1$ which directs flow of hydraulic fluid from the pump outlet to either of the lines 76, 82 to raise or lower the beam. The third position of valve $V_1$, which is its normal, relaxed state, is a neutral configuration in which all fluid flow through the valve to and from the lines 76, 82 is blocked. Thus, when valve $V_1$ is in its neutral position the spindle 18 will remain in the position which it was in when the valve $V_1$ shifted to its neutral position. When solenoid U is actuated fluid from the pump is directed through lines 76 into the upper chamber 68 to raise the spindle 18. The spindle continues to rise until cam 144 engages switch CS2 which deenergizes solenoid U and enables valve $V_1$ to shift to its neutral position. Switching of CS2 connects line 152 to line 158. During the upward travel of the spindle 18 cam 144 deactuates switch CS1 thus closing that switch and connecting the power supply 146 through line 148, 160, relay contact RC2 and line 162 to energize relay R3. When relay R3 is energized, relay contact RC3, RC3' close. Contact RC3 connects line 160 directly with relay R3, bypassing relay contact RC2 to lock relay R3 closed regardless of the position of relay contact RC2. Closing of contact RC3' connects line 164 to relay R4 so that when thumb button 140 is manually depressed to close the normally open switch MS1 relay R4 will be energized to continue the operational sequence of the machine. Until thumb button 140 is depressed the machine will remain in its spindle-up position but with the beam remaining in the position which it was previously.

The operator may then operate the various controls in a manner depending on whether he wishes to swing the beam to its out-of-the-way position, swing the beam to a selected position over the cutting table or effect a cutting stroke. Assuming, for example, that the beam is disposed over the table and the operator wishes to swing it out of the way to a more remote position so that he may arrange the sheet material to be cut and the die in a desired position on the cutting table. This may be accomplished simply by depressing the thumb button 140 which closes switch MS1 and connects relay R4 across the power supply through lines 148, 164, 156. Energizing of relay R4 switches relay contacts RC4 and RC4' to their closed positions. Closing contact RC4' connects line 168 to the power supply 146. Line 168 is connected through a manually operable switch MS3 to either of lines 172, 174. If, as shown switch MS3 is preset to connect line 168 to line 174, current in line 174 will actuate solid state switch 176 thus enabling current to flow from the power supply 146 through line 148, 178, through switch 176, and line 180 thus energizing solenoid R. Solenoid R controls the valve V2 to shift that valve from its neutral position to one in which oil is directed from the pump to lines 96', 98' thus advancing the rack 86 to the right as seen in FIGS. 5 and 10 and rotating the spindle 18 and beam 20 to the right hand side of the machine as seen by the operator. The beam and spindle will rotate as long as the operator maintains thumb button 140 depressed until, of course, the beam has swung to its fully right position shown in FIGS. 1, 2 and 3 in solid.

It may be noted that switch MS3 will be preset depending on whether the operator is right or left handed. The setting shown in FIG. 10, which will cause the beam 20 to swing out of the way and to the right is intended to be used where the operator holds the handle 138 with his right hand while manipulating the sheet material and/or cutting die with his left hand. During such manipulation he will swing the control arm mechanism 22 sufficiently to the right to provide adequate clearance for his left hand to perform the intended workpiece manipulations. With the switch MS3 thus set to cause the beam to retractably swing to the right when thumb button 140 is depressed, the beam 20 will always be swung in a direction which is away from the operator's left hand which is on or about the table thus avoiding the possibility of the beam striking his left hand during retraction. In the case of a left handed operator who would normally hold the handle 138 with his left hand and perform the foregoing work manipulations with his right the switch MS3 would be preset to connect line 168 with line 172. In the same manner as described above, this would switch solid state switch 182 to an "on" state, permitting current to flow from line 148 through line 184, through switch 182 and line 186 to actuate solenoid L. This would cause the beam swing to return in the opposite direction, to the left as viewed by the operator. Switch MS3 preferably is mounted to the machine in a somewhat out-of-the-way location so that it will be preset only intentionally. It should be noted that when the machine is being operated, the beam ordinarily will not be swung to its fully retracted position. In order to save time and increase production the operator need only to cause the beam to retract sufficiently far enough for him to manipulate the die, etc. The extent of retraction can be controlled by releasing thumb button 140.

When the die 26 has been positioned as desired the operator then swings the control arm mechanism 22 to the intended position of the beam 20 for cutting, usually directly over the die as suggested in phantom in FIS. 2 and 3. He then must actuate, concurrently, FIGS. button 140 and either of the side buttons 142. This will cause the beam to swing into alignment with the control arm and then, if the operator maintains buttons 140, 142 depressed will automatically lower and then raise the spindle 12 and beam 20 in a cutting cycle. Assuming that the beam 20 was retracted and the control arm mechanism 22 is swung to the left of the beam over the cutting die, concurrent depression of buttons 140, 142 will close the switches MS1 and MS2 respectively. This energizes relay R4 through line 164 and also energizes relay R2 through line 190. Energizing relay R4 closes relay contacts RC4 and RC4' as well as switching relay contacts RC2, RC2'. Switching of contact RC2' disconnects line 168 from the circuit and connect lines 158, through relay contact RC4' to either of lines 192, 194 depending on the state of relay contact RC5. Lines 192, 194 are connected, respectively, to lines 172, 174 which, through solid state switches 182, 176 to control operation of the valve V2 as described above. The configuration of relay contact RC5 is controlled by relay R5 which in turn is controlled by the relative configuration of switches CS3, CS4. For example, with the control arm mechanism 22 to the left of the beam 20, cam 128 will be out of engagement with switch CS4 thus switching switch CS4 to connect lines 196 and 198. Where relay contact RC2 has been switched to connect lines 160, 196, relay R5 is energized which switches relay contact RC5 into connection with line 192. This switches solid state switch 182 to enable actuation of solenoid L causing the beam to swing to the left and toward the position of the control arm mechanism 22. The beam will continue to swing toward the control arm until cam 128 engages switch CS4 which deenergizes relay R5 causing relay contact RC5 to switch back into connection with line 194. At this time, however, both switches CS3, CS4 are actuated by their respective cams 126, 128 (switch CS3 was in engagement with cam 126 at all times when the control arm was to the left of the beam). When both CS3 and CS4 are actuated as shown in FIG. 10, relay R1 is energized through the circuit line 160, 196, 200, 202, relay contact RC4 and line 204. When relay R1 is energized relay contact RC1 switches to a closed position and relay contact RC1' switches to connect lines 148 and 150 to line 206 to solenoid D. Energizing of solenoid D shifts valve V1 to direct oil through line 82 to urge the spindle downwardly in a cutting stroke. As the spindle advances downwardly switch CS2 switches to connect lines 152 and 154 (when contact RC1' switches). The downward cutting stroke continues until cam 144 actuates switch CS1 thus breaking the circuit in line 160. This deenergizes relay R3, opening relay contacts RC3, RC3'. Opening relay contact RC3' in turn deenergizes relay R4 which, in turn, opens relay contact RC4. This deenergizes relay R1, opening contact RC1 and switching contact RC1' to reconnect line 150 with line 152. Where switch CS2 has been switched into connection with line 154, solenoid U is energized, switching valve V1 to direct oil through line 76 and raise the spindle. As described above the spindle will rise until cam 144 engages switch CS2 which deenergizes solenoid U and enables valve V1 to return to its neutral position.

Means may be provided to enable the upper and lower limits of movement of the beam to be adjusted. This may be accomplished by the arrangement suggested in FIGS. 4 and 5 by which each of the switches CS1 and CS2 may be independently vertically adjusted by the mechanism 141 shown, which includes rotatable controls 143, 145 at the front of the machine.

From the foregoing description of the control mechanism and circuitry it may be seen that at all times during movement of the beam, except that time when the beam is being moved to a remote out-of-the-way position, the operator must maintain both hands on the control arm in order to concurrently actuate, and maintain actuated, the switch operating buttons 140, 142. Release of thumb button 140 will stop movement of the beam substantially immediately. Release of either of the side buttons 142 will stop movement of the beam and will cause the beam to move toward its selected right or left out-of-the-way position as long as thumb button 140 remains depressed. Release of both buttons 140, 142 will stop movement of the beam and, if such release was during the cutting stroke, will immediately cause the beam to move upwardly toward its raised position where it will then stop. Thus, the machine provides a high degree of safety in that by locating the bottons 140, 142 sufficiently far apart that the operator cannot operate them simultaneously with only one hand. In addition, the placement of the control and control box over the beam 20 further minimizes the possibility of danger to the operator as well as providing a comfortable arrangement by which he may manipulate the controls. In addition, location of the control mechanisms over the beam eliminates the inconvenience and awkwardness of prior such devices in which the control elements were located at the front of the frame of the machine below the cutting table. Where sheet material in roll form is continuously fed forwardly over the cutting table, the remains from the cut portion of the sheet, with machine prior amchine configurations, would sometimes overlie the controls at the front portion of the frame below the cutting table and make manipulation of the controls somewhat awkward. The control arrangement also enables a mode of operation in which the operator can place a plurality of cutting dies on the sheet material at selected locations and sequentially cause the beam to move over each of the dies, effect a cutting stroke and then move to a working position over another of the dies. The control circuitry enables the control arm to be swung to a new position even while the beam is completing a cutting stroke. The cutting stroke will be completed as long as the operator maintains both thumb buttons 140, 142 depressed. Immediately after the cutting stroke is completed with the beam in its raised position, the beam may be swung to the new position in readiness to effect the next cutting stroke.

As mentioned above, the invention has been illustrated as being incorporated into a die cutting machine of the type in which the beam is mounted for pivotal movement about an axis so that it may be swung in an arc over the cutting table. The invention, however, also may be employed in other types of die cutting machines in which the impact member may be movable linearly over the cutting table. The control member in such a machine need not strictly be mounted over the impact member but may be disposed elsewhere in a convenient location in the machine and interconnected with the control circuitry for the machine to provide the above described analogous positions of the control member with the intended working position of the impact member with respect to the table.

It should be understood that the foregoing description of the invention is intended merely to be illustrative thereof and that other embodiments and modifications may be apparent to those skilled in the art without departing from its spirit.

Having thus described the invention what we desire to claim and secure by Letters Patent is:

1. A die cutting machine comprising:
   a frame;
   a cutting table supported on said frame;
   an impact member supported by said frame;
   means mounting said impact member for movement between a working position over said cutting table to enable said impact member to be disposed over substantially any selected region of said cutting table and a position remote from said working position;
   first drive means for effecting said movement of said impact member between said working an remote positions;
   means mounting said impact member for movement toward and away from said cutting table;
   second drive means for effecting said movement of said impact member toward and away from said cutting table;
   a control member mounted to said machine for movement between a range of positions which are analogous to the range of working positions of said impact member relative to said cutting table;
   means for sensing a difference between the relative analogous positions of said control member and said impact member with respect to said cutting table, the sensing means including means for controlling the operation of said first drive means; and
   manually actuable control means operative independently of movement of said control member and being operatively associated with said sensing means to cause the sensing means to operate said first drive means to move said impact member to a working position with respect to said cutting table which is analogous to the position of said control member.

2. A machine as defined in claim 1 wherein said control means comprises:
   a pair of manually operable controls mounted to said machine at locations so disposed as to require two-hand operation of said manually operable controls.

3. A die cutting machine comprising:
   a frame;
   a cutting table supported on said frame;

an impact member supported by said frame;

means nounting said impact member for movement between a working position over said cutting table to enable said impact member to be disposed over substantially any selected region of said cutting table and a position remote from said working position;

first drive means for effecting said movement of said impact member between said working and remote positions;

means mounting said impact member for movement toward and away from said cutting table;

second drive means for effecting said movement of said impact member toward and away from said cutting table;

a control member mounted to said machine for movement between a range of positions which are analogous to the range of working positions of said impact member relative to said cutting table;

means for sensing a difference between the relative analogous positions of said control member and said impact member with respect to said cutting table;

control means including a pair of manually operable controls mounted to said machine at locations so disposed as to require two-hand operation, said control means being operatively associated with said sensing means for operating said first drive means to move said impact member to a working position with respect to said cutting table which is analogous to the position of said control member; and means responsive to concurrent movement of said member to said working position and operation of both of said manually operable controls for actuating said second drive means to move said impact member first toward and then away from said cutting table.

4. A die cutting machine comprising:

a frame;

a cutting table supported on said frame;

an impact member supported by said frame;

means mounting said impact member for movement between a working position over said cutting table to enable said impact member to be disposed over substantially any selected region of said cutting table and a position remote from said working position;

first drive means for effecting said movement of said impact member between said working and remote positions;

means mounting said impact member for movement toward and away from said cutting table;

second drive means for effecting said movement of said impact member toward and away from said cutting table;

a control member mounted to said machine for movement between a range of positions which are analogous to the range of working positions of said impact member relative to said cutting table;

means for sensing a difference between the relative analogous positions of said control member and said impact member with respect to said cutting table;

control means inlcuding a pair of manually operable controls mounted to said machine at locations so disposed as to require two-hand operation, said control means being operatively associated with said sensing means for operating said first drive means to move said impact member to a working position with respect to said cutting table which is analogous to the position of said control member; and means responsive to release of either of said manually operable controls during movement of said impact member toward said working position for precluding further movement of said impact member toward said working position.

5. A machine as defined in claim 4 further comprising:

means responsive to operation of only one of said manually operable controls for reversing said first drive means to move said impact member back toward a remote position.

6. A machine as defined in claim 3 further comprising:

said control means being constructed and arranged so that release of either of said manually operable controls during said movement of said impact member toward said cutting table will reverse said second drive means to terminate said movement of said impact member toward said cutting table and to move said impact member away from said cutting table.

7. A machine as defined in claim 3 further comprising:

means enabling said control member to be moved to another position during said movement of said impact member toward and away from said cutting table; and means responsive termination of said upward movement of said impact member for actuating said first drive means to move said impact member to a working position which is analogous to said another position of said control member.

8. A die cutting machine comprising:

a frame;

a cutting table supported horizontally on said frame;

a spindle mounted to said frame for rotation about movement longitudinally along a vertical axis;

first drive means for effecting rotational movement of said spindle;

second drive means for effecting said vertical movement of said spindle;

a beam secured to said spindle and disposed above said cutting table;

said beam extending radially from said spindle and being movable in unison therewith, said beam and spindle being constructed to enable said beam to be swung to substantially any position over said cutting table;

an arm mounted to said spindle and extending generally radially therefrom for vertical movement in unison with said spindle and beam and for rotation relative to said spindle and beam, said arm being adapted to be manually located in substantially any desired position over said cutting table independently of the position of said beam;

means for sensing the relative positions of said control arm and said beam with respect to said cutting table;

manually actuable control means mounted to the free end of said control arm and being operatively associated with said sensing means for manually operating said first drive means to rotate said spindle to swing said beam to a position in substantial alignment with said arm, said control means being actuable manually and independently of the relative position of said beam and said control arm.

9. A machine as defined in claim 8 wherein said arm is disposed above said beam.

10. A machine as defined in claim 9 wherein said manually actuable control means comprises:
   a pair of manually operable controls mounted to the free end of said arm at locations disposed to require two-hand operation of said controls.

11. A die cutting machine comprising:
   a frame;
   a cutting table supported horizontally on said frame;
   a spindle mounted to said frame for rotation about movement longitudinally along a vertical axis;
   first drive means for effecting rotational movement of said spindle;
   second drive means for effecting said vertical movement of said spindle;
   a beam secured to said spindle and disposed above said cutting table;
   said beam extending radially from said spindle and being movable in unison therewith, said beam and spindle being constructed to enable said beam to be swung to substantially any position over said cutting table;
   an arm mounted to said spindle and extending generally radially therefrom for vertical movement in unison with said spindle and for rotation relative to said spindle and beam, said arm being adapted to be manually located in substantially any desired position over said cutting table;
   means for sensing the relative positions of said control arm and said beam with respect to said cutting table;
   control means mounted to the free end of said control arm operatively associated with said sensing means for operating said first drive means to rotate said spindle to swing said beam to a position in substantial alignment with said arm; and
   means responsive to concurrent manual actuation of said control means and rotation of said beam into alignment with said arm for actuating said second drive means first to drive said spindle and beam downwardly toward said table and then to move said spindle and beam upwardly.

12. A die cutting machine comprising:
   a frame;
   a cutting table supported horizontally on said frame;
   a spindle mounted to said frame for rotation about movement longitudinally along a vertical axis;
   first drive means for effecting rotational movement of said spindle;
   second drive means for effecting said vertical movement of said spindle;
   a beam secured to said spindle and disposed above said cutting table;
   said beam extending radially from said spindle and being movable in unison therewith, said beam and spindle being constructed to enable said beam to be swung to substantially any position over said cutting table;
   an arm mounted to said spindle and extending generally radially therefrom for vertical movement in unison with said spindle and for rotation relative to said spindle and beam, said arm being adapted to be manually located in substantially any desired position over said cutting table;
   means for sensing the relative positions of said control arm and said beam with respect to said cutting table;
   control means mounted to the free end of said control arm operatively associated with said sensing means for operating said first drive means to rotate said spindle to swing said beam to a position in substantial alignment with said arm; and
   said means for sensing the relative positions of said arm and said beam comprising:
   cam operated switch means including a pair of switches and a pair of cams, each switch being operable in response to one of said cams, said cam operated switch means mounted to said spindle and said control arm and being so constructed and arranged that for any relative position of said beam and said control arm other than a relative position of substantial alignment, one of said switches will be actuated and the other of said switches will be unactuated by their respective cams;
   and means controlled by said cam operated switches and concurrent actuation of said manually actuable control means for actuating said second drive means to drive said spindle downwardly when said beam is in alignment with said arm and both of said cam operated switches are actuated.

13. A machine as defined in claim 12 wherein said manually actuable control means comprises:
   a pair of manually operable controls mounted to the free end of said arm at locations disposed to require two-hand operation of said manually operable controls.

14. A die cutting machine comprising:
   a frame;
   a cutting table supported on said frame;
   an impact member supported by said frame;
   means mounting said impact member for movement between a working position over said cutting table to enable said impact member to be disposed over substantially any selected region of said cutting table and a position remote from said working position;
   drive means for effecting movement of said impact member between said working and remote positions;
   a control member mounted to said machine for movement between a range of positions which are analogous to the range of working positions of said impact member relative to said cutting table, said movement of said control member and said impact member being completely independent of each other.

* * * * *